United States Patent
Posselius, Jr. et al.

[11] Patent Number: 6,001,641
[45] Date of Patent: Dec. 14, 1999

[54] CONTROL SYSTEM FOR A ROTARY COMPOSTER

[75] Inventors: John H. Posselius, Jr., Ephrata; Shaun A. Seymour, New Holland, both of Pa.

[73] Assignee: New Holland North America, Inc., New Holland, Pa.

[21] Appl. No.: 09/261,113

[22] Filed: Mar. 3, 1999

Related U.S. Application Data

[63] Continuation of application No. 08/927,631, Sep. 11, 1997, Pat. No. 5,925,561, which is a continuation-in-part of application No. 08/660,136, Jun. 7, 1996, abandoned.

[51] Int. Cl.$^6$ .................................................. C12M 3/00
[52] U.S. Cl. ................................ 435/286.1; 435/286.6; 435/286.7; 435/290.3; 435/290.4
[58] Field of Search .......................... 435/286.1, 286.6, 435/286.7, 290.1, 290.2, 290.3, 290.4

[56] References Cited

U.S. PATENT DOCUMENTS

| | | | |
|---|---|---|---|
| 3,054,663 | 9/1962 | Komline | 23/259.1 |
| 3,178,267 | 4/1965 | Larson | 23/259.1 |
| 3,676,074 | 7/1972 | Shibayama et al. | 23/259.1 |
| 5,047,349 | 9/1991 | Eweson | 435/312 |
| 5,300,438 | 4/1994 | Augspurger et al. | 435/312 |
| 5,407,809 | 4/1995 | Finn | 435/41 |

Primary Examiner—David A. Redding
Attorney, Agent, or Firm—Larry W. Miller; J. William Stader; Frank A. Seemar

[57] ABSTRACT

A rotary composter is provided with a control system that is operable to control the operation of a rotary composter equipped with a variable rate air flow mechanisms and a variable speed drive for rotating the composter vessel. The control system includes a microprocessor in which is stored a look-up table to control the variable rate of application of both air flow and vessel rotation in response to sensed parameters corresponding to the operation of the composter. The control system further includes sensors at each digesting compartment within the composter vessel to provide information relating to the temperature within the vessel. Gas sensors detect the levels of carbon dioxide and ammonia within the air flow through the composter vessel. The microprocessor compares the temperature and gas data to permissible ranges therefor and determines if the composter is operating properly. In the event that operational changes are necessary, the microprocessor can effect the changes in speed of rotation of the vessel and the rate of air through the vessel either manually or automatically. To improve performance of the gas sensors, the composter vessel is provided with a smaller diameter sensor drum through which the air flow through the composter vessel can be discharged.

18 Claims, 12 Drawing Sheets

| Col.\Row | 1 | 2 | 3 | 4 | 5 | 6 | 7 | 8 | 9 |
|---|---|---|---|---|---|---|---|---|---|
| 1 | T+ C+ N+ | T+ C* N+ | T+ C- N+ | T+ C+ N* | T+ C* N* | T+ C- N* | T+ C+ N- | T+ C* N- | T+ C- N- |
| 2 | T* C+ N+ | T* C* N+ | T* C- N+ | T* C+ N* | T* C* N* | T* C- N* | T* C+ N- | T* C* N- | T* C- N- |
| 3 | T- C+ N+ | T- C* N+ | T- C- N+ | T- C+ N* | T- C* N* | T- C- N* | T- C+ N- | T- C* N- | T- C- N- |

T = TEMPERATURE CONDITION  
C = CARBON DIOXIDE ($CO_2$)  
N = AMMONIA ($NH_3$)  
* = CONDITION WITHIN NORMAL LIMITS  
+ = CONDITION HIGH  
− = CONDITION LOW

Fig. 15

| FIG. 15A |
|----------|
| FIG. 15B |

Fig. 15A

| CONDITION FROM MATRIX (ROW-COLUMN) | MATERIAL INPUTS | AIR FLOW (FAN SPEED) | ROTATIONAL SPEED OF DRUM |
|---|---|---|---|
| 1-1 | IF COUNTER = 10, ADD CARBON SOURCE | INCREASE | INCREASE |
| 1-2 | IF COUNTER = 5, ADD CARBON SOURCE | INCREASE | IF C = 5, INCREASE |
| 1-3 | ADD CARBON SOURCE | INCREASE | IF C = 5, INCREASE |
| 1-4 | IF COUNTER = 5, ADD NITROGEN SOURCE | INCREASE | IF C = 5, INCREASE |
| 1-5 | ADD NOTHING | INCREASE | IF C = 5, INCREASE |
| 1-6 | ADD NOTHING | DO NOTHING | DO NOTHING |
| 1-7 | ADD NOTHING | IF C = 5, INCREASE | INCREASE |
| 1-8 | ADD NOTHING | INCREASE | DO NOTHING |
| 1-9 | ADD NOTHING | INCREASE | DECREASE |

CONTROL SYSTEM FOR A ROTARY COMPOSTER

CROSS-REFERENCE TO RELATED APPLICATIONS

This application is a continuation of U.S. patent application Ser. No. 08/927,631, filed Sep. 11, 1997, now U.S. Pat. No. 5,925,561 which is a continuation-in-part of U.S. patent application Ser. No. 08/660,136, filed Jun. 7, 1996, now abandoned.

BACKGROUND OF THE INVENTION

This invention relates generally to a machine for creating compost from waste material, such as manure and biodegradable garbage, and more particularly, to a control system for automating the operation of the rotary composter for the biological degradation of organic waste materials.

Rotary composters are well known in the art, as is represented by U.S. Pat. No. 5,407,809, issued to Larry J. Finn on Apr. 18, 1995. The process achieves an accelerated biological degradation of the waste material to create compost therefrom. While any biodegradable material can be digested within the rotary composter, farm wastes, such as animal manure, are of particular interests because of the desire to fix the nitrogen within the material to prevent stream pollution when the composted waste is spread onto the ground.

Present day manure handling techniques typically provide for a collection of the manure until weather and ground conditions are acceptable to permit the raw manure to be spread over the fields. Since the nitrogen within the raw manure has not been fixed, any runoff, such as would occur following a storm, would have the potential for polluting the streams. Furthermore, free nitrogen in the form of nitrates can leach into the ground water supply and cause pollution. Accordingly, non-point sources of pollution, such as farming operations, have come under scrutiny with respect to manure handling.

The biggest problem with known rotary composters has been effective operation. The vessel is preferably sized to process the waste material within approximately three days. While the loading of waste material into the infeed end of the apparatus may be substantially continuous, actually on a periodic basis during the day, compost could be discharged in the same manner. Accordingly, the vessel must be designed to retard material flow through the vessel so that the material can be retained for at least three days. An adequate air supply must be provided through the vessel, as the biological degradation process is aerobic in nature, and the vessel must be designed to maintain a temperature of approximately 120 to 160 degrees fahrenheit, even in cold weather operation.

Efficient operation of the rotary composter is a function of controlling the air flow and rotational speed of the vessel to maintain the proper temperatures within the vessel, as well as the proper levels of carbon dioxide and ammonia gases emanating from the vessel from the composting process. Accordingly, it would be desirable to provide a monitoring system that will sense the temperature and desired gas parameters of the composting process to provide an indication of adjustments that should be made to the volume of air flow through the vessel or the rotational speed thereof. It would also be desirable to provide a control system for automating the operation of a variable flow air infeed mechanism and a variable speed rotational drive mechanism in response to the temperature and gas levels sensed from the composting operation within the vessel.

SUMMARY OF THE INVENTION

It is an object of this invention to overcome the aforementioned disadvantages of the prior art by providing a control system for the operation of a rotary composter.

It is an advantage of this invention that the operation of a rotary composter can be monitored from a remote location.

It is another advantage of this invention that the operation of the rotary composter can be automated.

It is a feature of this invention that the rotational speed and the rate of air inflow into the rotary composter can be controlled automatically in response to the sensed condition within the composter.

It is another feature of this invention that the operation of the rotary composter can be controlled by a microprocessor in response to the sensing of a given set of parameters relating to the composter's operation.

It is still another feature of this invention that the variable speed drive mechanism can be utilized to change the flow rate of material through the rotary composter.

It is still another advantage of this invention that the speed of operation of the rotary composter can be selectively varied to adapt the operation of the apparatus to accommodate variations in other external factors affecting the operation of the apparatus.

It is yet another advantage of this invention that both primary and auxiliary fan mechanisms can be operated at a variable speed to control the rate of the flow of air through the rotary composter vessel.

These and other objects, features and advantages are accomplished according to the instant invention by providing a control system that is operable to control the operation of a rotary composter equipped with a variable rate air flow mechanisms and a variable speed drive for rotating the composter vessel. The control system includes a microprocessor in which is stored a look-up table to control the variable rate of application of both air flow and vessel rotation in response to sensed parameters corresponding to the operation of the composter. The control system further includes sensors at each digesting compartment within the composter vessel to provide information relating to the temperature within the vessel. Gas sensors detect the levels of carbon dioxide and ammonia within the air flow through the composter vessel. The microprocessor compares the temperature and gas data to permissible ranges therefor and determines if the composter is operating properly. In the event that operational changes are necessary, the microprocessor can effect the changes in speed of rotation of the vessel and the rate of air through the vessel either manually or automatically. To improve performance of the gas sensors, the composter vessel is provided with a smaller diameter sensor drum through which the air flow through the composter vessel can be discharged.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
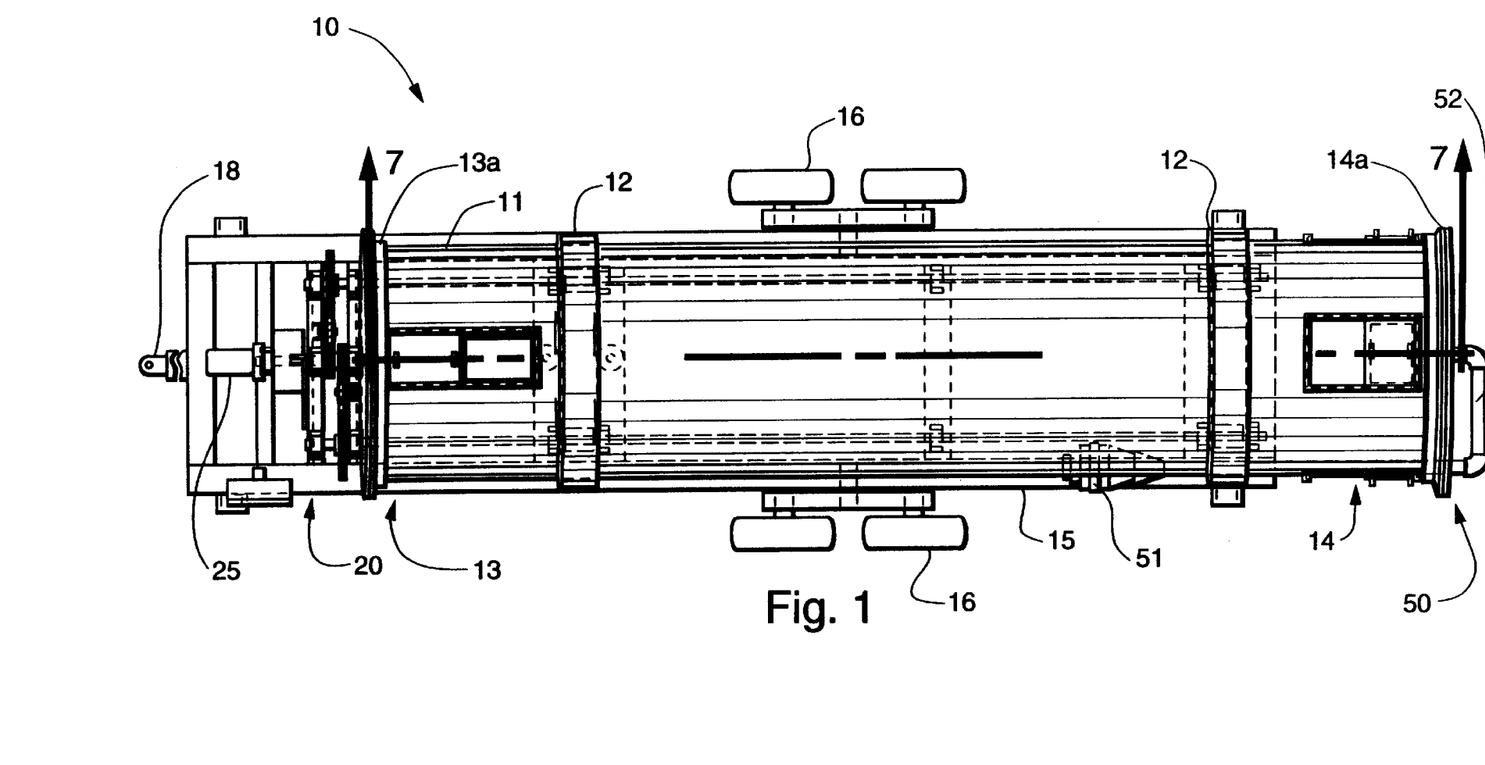
FIG. 1 is a top plan view of the rotary composter incorporating the principles of the instant invention, the cylindrical vessel being mounted on a mobile trailer frame having a portion of the draw bar broken away for purposes of clarity.
Figure 2:
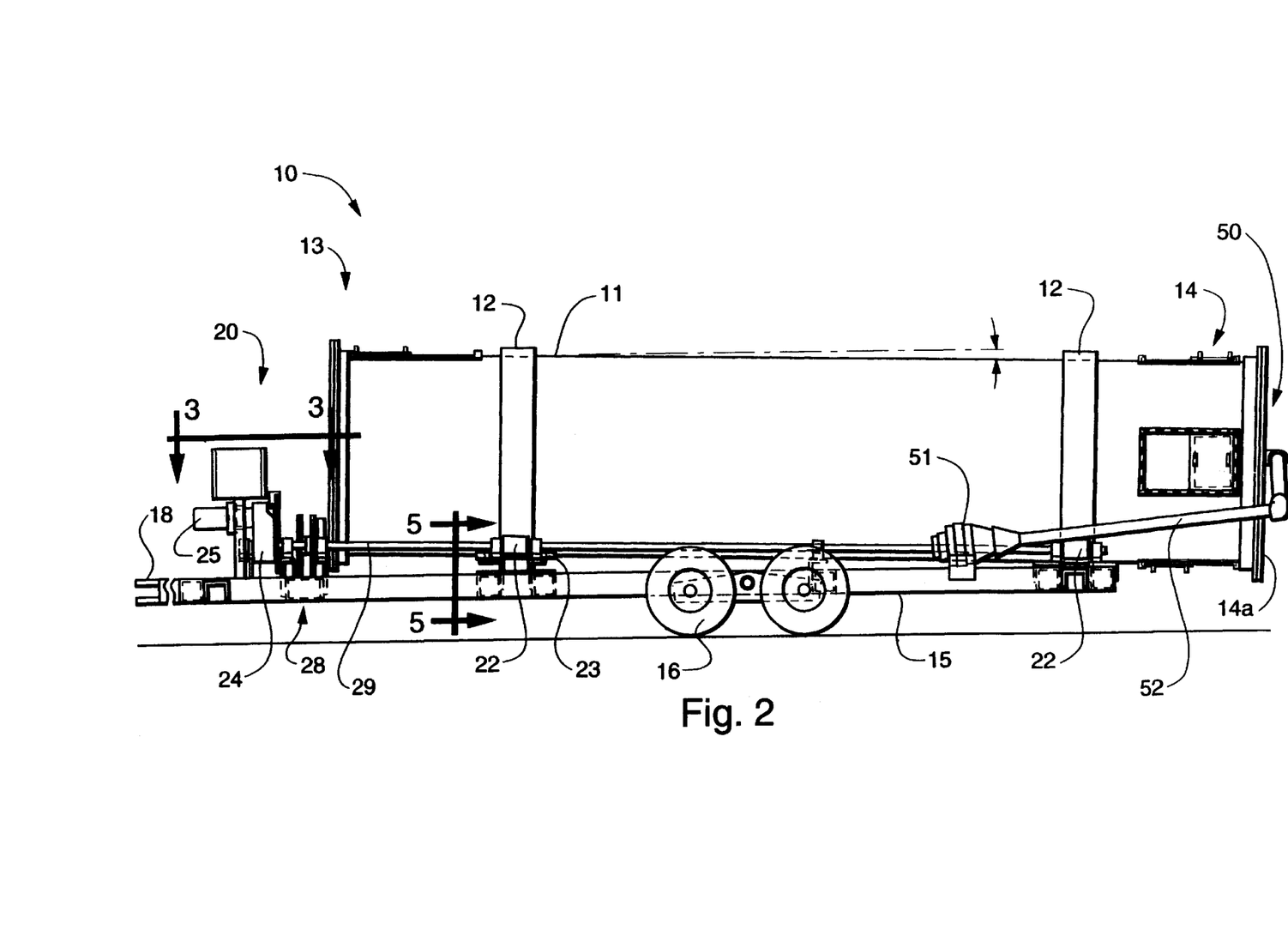
FIG. 2 is a side elevational view of the rotary composter shown in FIG. 1.
Figure 3:
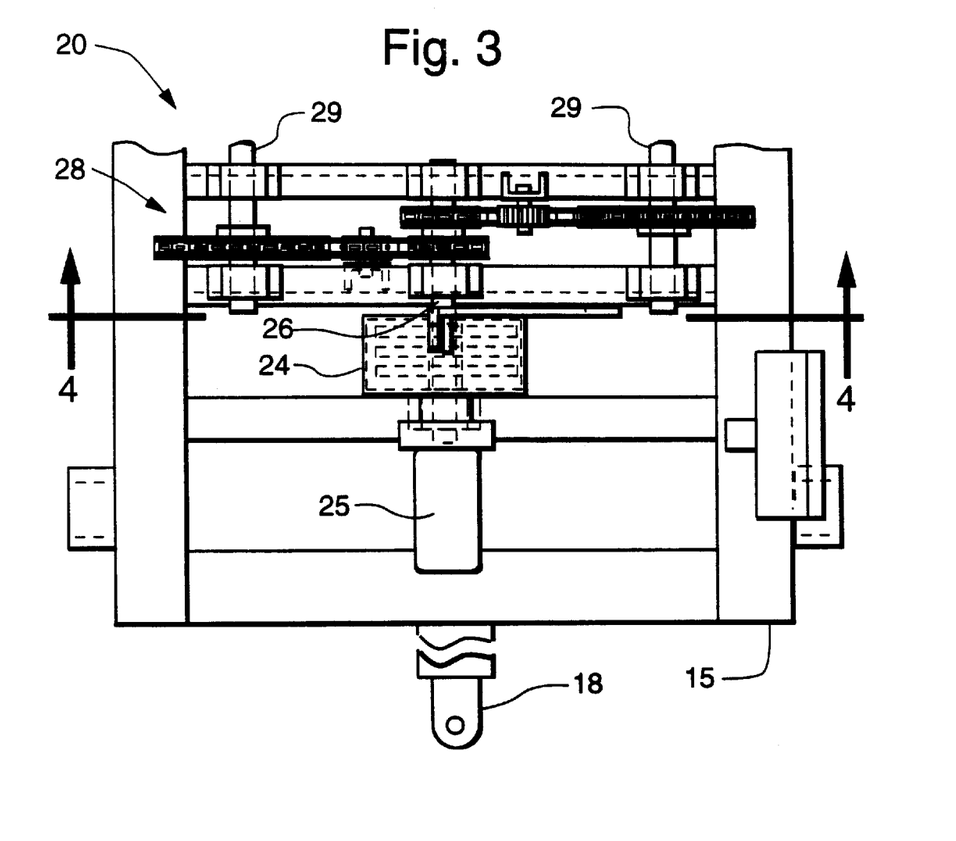
FIG. 3 is an enlarged top plan view of the drive mechanism located at the infeed end of the rotary composter, corresponding to lines 3—3 of FIG. 2.
Figure 4:
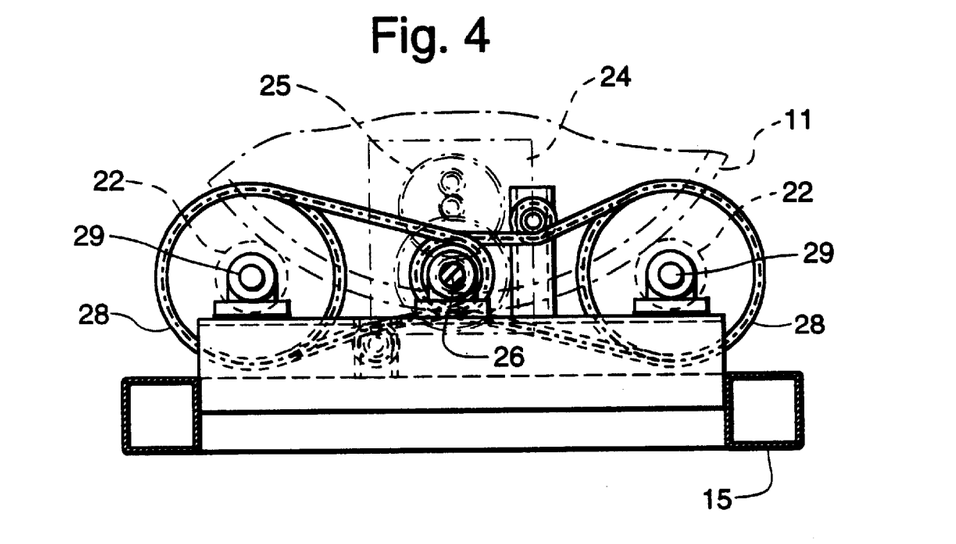
FIG. 4 is a partial cross-sectional view of the drive mechanism corresponding to lines 4—4 of FIG. 3, the vessel being shown in phantom.
Figure 5:
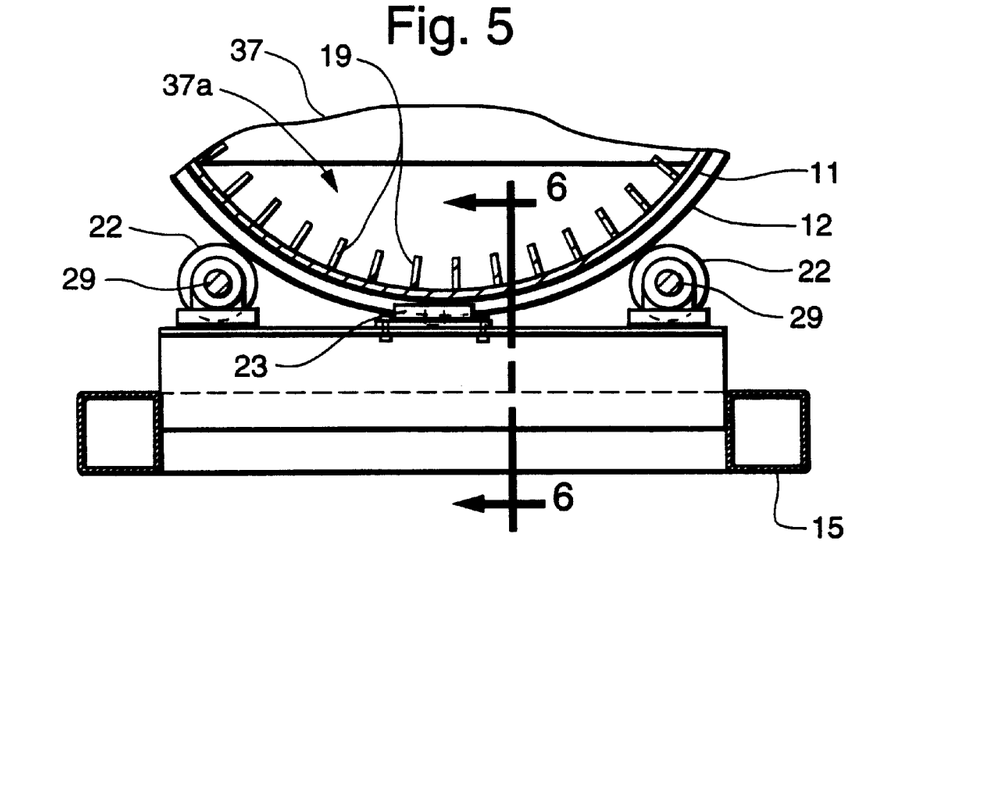
FIG. 5 is an enlarged partial cross-sectional view of the rotary composter corresponding to lines 5—5 of FIG. 2 to depict the rotational support of and the rotational drive rollers for the vessel on the mobile trailer frame, most of the vessel structure being broken away for purposes of clarity.

Referring now to the drawings and, particularly, to FIGS. 1 and 2, the rotary composter incorporating the principles of the instant invention can best be seen. Left and right references are used as a matter of convenience and are determined by standing at the infeed end of the cylindrical vessel at the location of the drive mechanism and facing the remote discharge end thereof.

The rotary composter 10 is constructed as a generally cylindrical drum-like vessel 11 rotatably supported on a wheeled trailer frame 15 having a set of wheels 16 to permit movement of the composter 10 over the ground G and a hitch member 18 to connect the trailer frame 15 to a prime mover. One skilled in the art will readily realize that the mobility enabled by the wheeled trailer frame 15 is not a critical factor of the instant invention, as the wheels 16 need to be removed from the frame 15 when the composter 10 is set up for operation to provide proper leveling and more stability for the operation of the composter 10.

The frame 15 does provide a support for the rotation of the drum 11, as will be described in greater detail below, and further supports the drive mechanism 20. The vessel 11 is at inclined downwardly on the frame 15 from the inlet or infeed end 13 toward the discharge end 14, preferably at an angle of approximately one and a half degrees from horizontal. Preferably, the exterior circumference of the vessel 11, except for the traction bands 12, is covered with a layer of polyurethane foam (not shown) to insulate the vessel 11 and retain heat generated by the composting process within the interior of the vessel 11.

Referring now to FIGS. 1–6, the drive mechanism 20 can best be seen. The vessel 11 includes a pair of longitudinally spaced traction bands 12 extending around the outer circumference of the vessel 11. The frame 15 supports a pair of transversely spaced drive rollers 22, best seen in FIGS. 4 and 5, engaged with each of the traction bands 12 to effect rotation of the vessel 11. The drive mechanism 20 further includes a motor 25, preferably electrical, although other primary drive members, such as a hydraulic motor, could be equally used. The output shaft 26 from the motor 25 is operably coupled to a reduction gear box 24 and a pair of chain drives 28 that effect rotation of a corresponding pair of drive shafts 29 connected to the drive rollers 22 to effect the final output speed of rotation of the vessel 11 at approximately one half of a revolution per minute or less.

Figure 6:
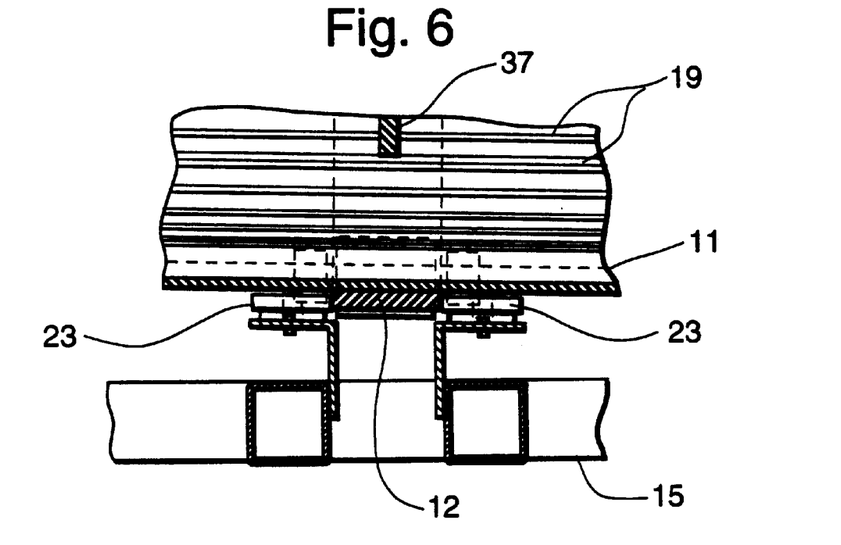
FIG. 6 is a partial cross-sectional view of the rotary composter corresponding to lines 6—6 of FIG. 5 to depict the thrust bearing arrangement rotatably supporting the vessel on the mobile trailer frame.

Preferably, the motor 25 is variable in speed so that the speed of rotation of the vessel 11 can be varied within the range of two and a half minutes per revolution to approximately thirteen minutes per revolution of the vessel 11. Since the vessel 12 is inclined relative to horizontal so that the rotation of the vessel 12 will move material within the vessel toward the discharge end 14, each traction band 12 is captured by a thrust bearing 23, as best seen in FIG. 6, supported by the frame 15 to prevent longitudinal displacement of the vessel 12 relative to the frame 15.

Figure 7:
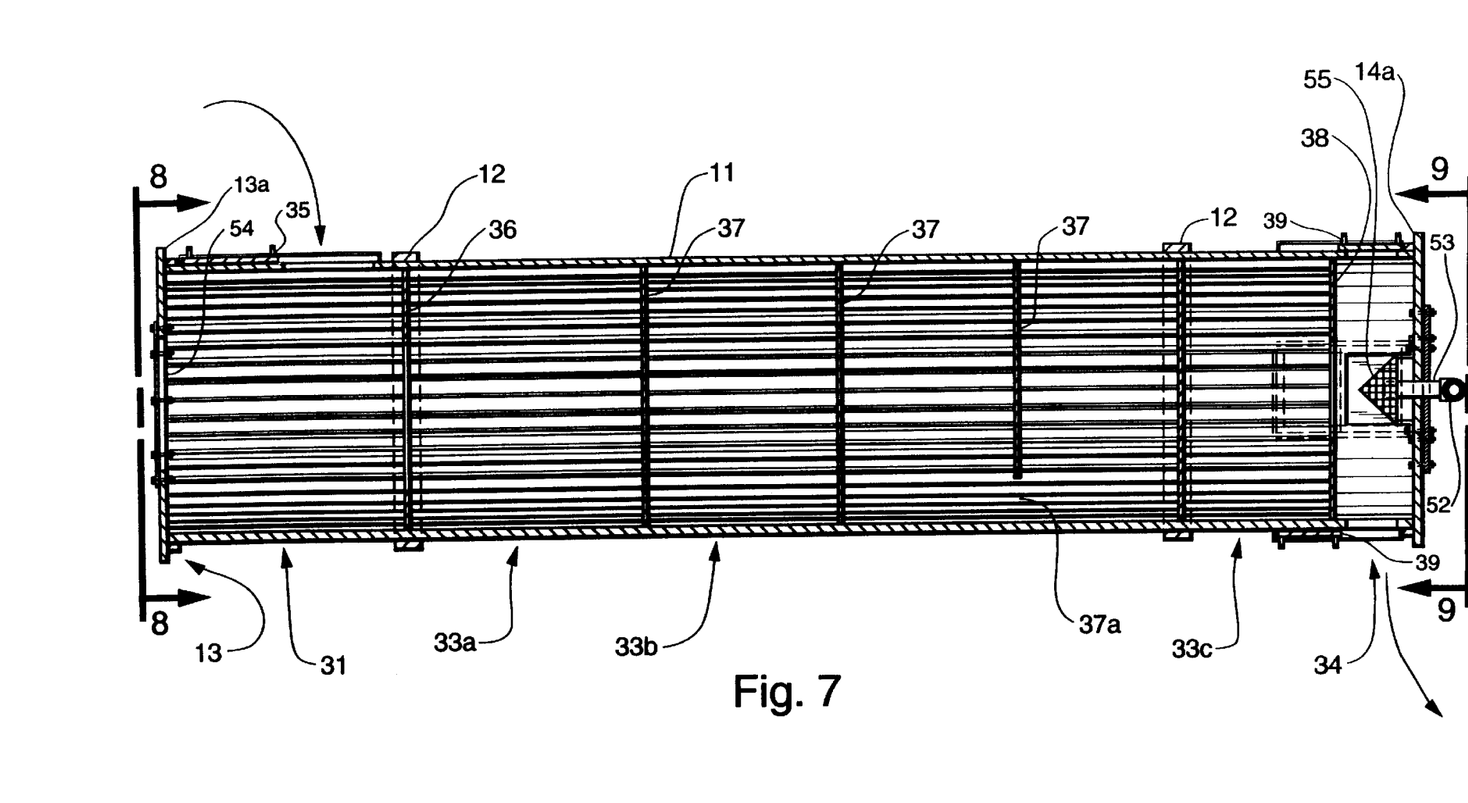
FIG. 7 is a cross-sectional view of the rotary composter vessel taken along lines 7—7 of FIG. 1, all drive mechanism and mobile trailer frame supports have been removed for purposes of clarity.
Figure 8:
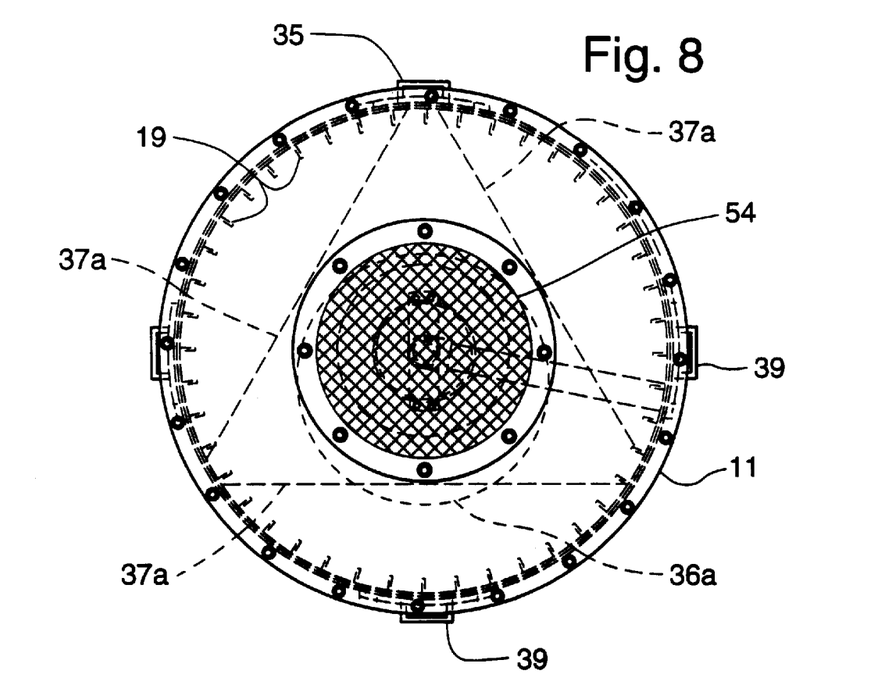
FIG. 8 is an enlarged elevational end view of the infeed end of the rotary composter vessel corresponding to lines 8—8 of FIG. 7.

Referring now to FIGS. 1, 2 and 7, it can be seen that the vessel 12 is divided into a series of discrete compartments. Beginning at the infeed end 13, the first vessel compartment 31 is defined as the space between the end wall 13a of the vessel 11 and the first baffle 36 and is adapted for receiving the material to be composted. The first or infeed compartment 31 is provided with an access door 35 formed within the exterior circumference of the vessel 11 to permit the introduction of material within the infeed compartment 31 to be composted. The access door 35 is preferably slidable between an opened position and a closed position to prevent the spilling of material from the infeed compartment 31 as the vessel 11 rotates.

The last compartment 34 at the discharge end 14 of the vessel 11 is defined as the space between the discharge end wall 14a and the last baffle 38. The last or discharge compartment 34 is provided with four discharge doors 39 equally spaced around the circumference of the vessel 12. The discharge doors 39 are also preferably of the slidable variety that can be moved between opened and closed positions to control the discharge of compost therefrom. The opening of the discharge doors 39 will allow the compost within the discharge compartment 38 to spill therefrom as the vessel 11 is rotated. Between the infeed compartment 31 and the discharge compartment 38, the vessel 11 is divided into a plurality, preferably four, digesting compartments 33 separated by an interior baffle 37.

The interior baffles are constructed as a truncated disc that covers approximately 85 percent of the cross-sectional area of the vessel 11. The passageway 37a formed by the missing segment of the circular disc-like baffle 37 is oriented 120 degrees out of phase with the immediately succeeding or preceding baffle 37. When one passageway is oriented at an azimuth of approximately 60 degrees, the next passageway is located at an azimuth of approximately 300 degrees. Likewise, the next two interior baffles have the passageway oriented at an azimuth of approximately 180 degrees and back at 60 degrees, respectively.

The first baffle 36 is preferably constructed with an eccentric opening 36a through the center of the baffle. The eccentric opening 36a forms a weir that prevents all of the material from moving from the first compartment 31 into the adjacent first digesting compartment 33a. As a result, a portion of the microbes that effect the composting activity within the vessel 11 will be retained within the infeed compartment 31 to inoculate the material subsequently introduced through the infeed opening 35 to start the composting process before the material even moves into the first digesting compartment 33a. Similarly, the last baffle 38 has a concentric opening 38a therethrough to provide a weir to retain a microbial inoculant within the last digesting compartment 33d, thereby insuring that the digesting compartments contain at least a minimum supply of microbes to hasten the digesting or composting process.

Material to be composted is loaded through a suitable means (not shown) into the first compartment 31 and passes slowly from one digesting compartment to the next digesting compartment until reaching the discharge compartment 34. One skilled in the art will recognize that only small amounts of material in one digesting compartment 33 pass into the succeeding digesting compartment 33 on each revolution of the vessel 11. Further since the speed of rotation of the vessel 11 is in the order of a half of a revolution or less per minute, one skilled in the art will recognize that the vessel 11 can retain material within the rotating vessel 11 for three or more days from the time it is fed into the infeed compartment 31 and is discharged from the discharge compartment 34.

Referring now to FIGS. 1 and 7–9, the air infeed mechanism 50 can best be seen. A supply of ambient air is fed into the discharge compartment 34 to be pushed through the vessel 11 to exit at the screened opening 54 in the infeed opening 31. The staggered arrangement of the interior baffles 37, as described above, requires that the air fed into the discharge compartment 34 will necessarily follow a serpentine path to reach the infeed compartment 31. The spiraled movement of air through the vessel 11 facilitates the interaction of the air through the material within the digesting compartments 33. The direction of the flow of air through the vessel 11 is opposite to the direction of material flow through the vessel 11 in order to reduce the temperature of the material within the discharge compartment 34 and to transfer heat into the digesting compartments 33.

A blower 51 supported on the trailer frame 15 forces air through the pipe 52 that extends around the exterior of the vessel 11 to the center of the discharge end 14 of the vessel 11 to inject air into the discharge compartment 34. The pipe 52 passes through and is sealed against the discharge end wall 14a to terminate a short distance from the discharge end wall 14a into the discharge compartment 34 to define an air infeed port 53. The pipe 52 is fixed relative to the frame 15 and the vessel 11 rotates relative to the pipe 52.

Figure 9:
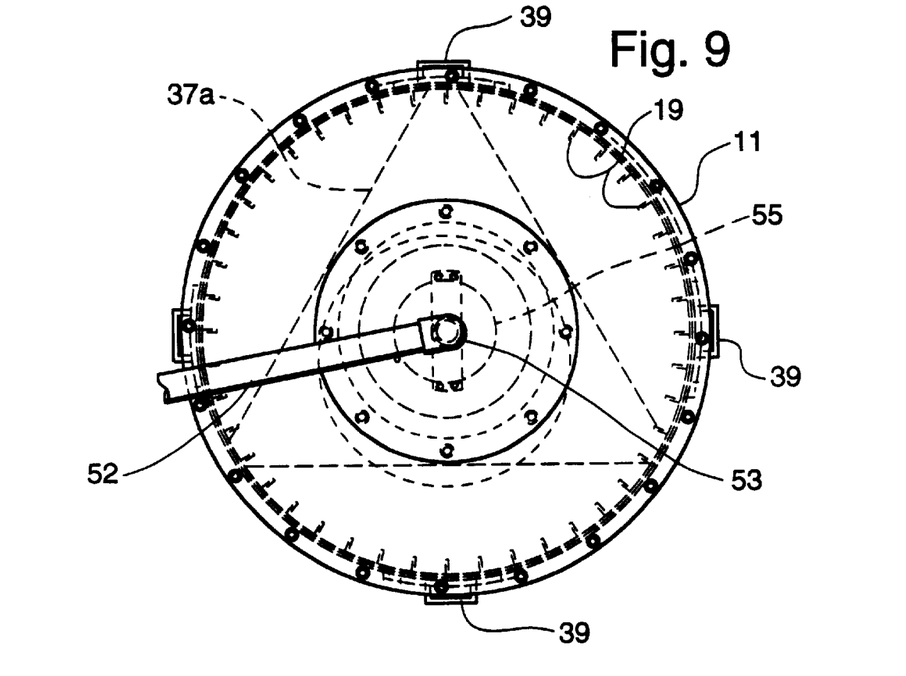
FIG. 9 is an enlarged elevational end view of the discharge end of the rotary composter vessel corresponding to lines 9—9 of FIG. 7.

The air infeed port 53 is surrounded by an air diffuser 55 formed as a cone pointed at the infeed end 13 of the vessel 11. The diffuser 55 is formed with a plurality of holes 59 therein to allow the passage of air therethrough from the air infeed port 53 which terminates near the center of the conical shape of the diffuser 55. The symmetrical conical shape of the diffuser 55 presents a uniform surface to the material accumulated within the discharge compartment 34 during the rotation of the vessel 11. The diffuser 55 is provided with a mounting bracket 56 that is detachably connected to the discharge end wall 14a by connectors 57.

By presenting a sloped surface to the material accumulated within the discharge compartment 34 and a spaced distance away from the discharge end wall 14a, material will not significantly accumulate on the diffuser 55. Furthermore, the holes 59 formed in the diffuser 55 are of a size to prevent the passage of large particles or clumps of material from passing through the diffuser 55 and plugging the air infeed port 53. Any material passing through the holes 59 can either pass back through the opposing holes 59 or slide off the interior sloped surface of the diffuser 55 to pass between the diffuser 55 and the discharge end wall 14a. As a result, material will not accumulate within the diffuser 55 to plug the air infeed port 53.

Preferably, the vessel 11 is approximately seven feet in diameter and approximately thirty-four feet in length. The vessel 11 is divided into six compartments, including the infeed compartment 31, the discharge compartment 34 and four interior digesting compartments 33. Preferably, the infeed compartment 31 will be the largest of the compartments and each subsequent compartment 33, 34 will be smaller in size such that the discharge compartment 34 is approximately half the size of the infeed compartment 31. Each interior baffle 37 is provided with a passageway 37a formed by a missing segment that measures approximately one and a half feet along the radius of the vessel 11.

The interior surface of the vessel 11 is provided with a plurality of circumferentially spaced lifter ribs 19 that extend radially into the interior of the vessel 11 about one and one half inches and are spaced apart about six inches around the circumference. When the vessel 11 is rotating, the segmented openings 37a offset around the circumference of the vessel 11 act like a large screw. As the lifter ribs 19 elevate the material in small increments through the passageways 37a into the subsequent compartment 33 on each rotation of the vessel 11. The weir formed by the central opening 38a in the last baffle 38 maintains a level of material within the vessel 11 to ensure that none of the compartments 33 can be completely emptied so that an inoculum is retained in each compartment to provide a staged microbiological culture for each of the compartments.

Air is supplied by a semi-pressure blower 51 to a center connection with the discharge end wall 14a. When the discharge doors 39 are closed, the vessel 11 is substantially sealed so that air is forced through the composting materials in the successive compartments 34, 33, 31 to be discharged through the screened opening 54. The blower 51 can be a double fan configuration or a variable speed fan so that the rate of air flow can be selectively varied. The direction of the flow of air is counter to the direction of the flow of the composting material through the vessel 11. Since the successive passageways 37a are circumferentially offset by 120 degrees, the air must move down through one passageway 37a and then around to the next passageway 37a and so on until passing through all four digesting compartments 33. Furthermore, the lifter ribs 19 elevate the composting material at the passageways 37a when overlapping the void 40 past the angle of repose, incorporating air as the material sloughs over in the void 40.

The time of passage of material through the vessel 11 is of critical importance. The material within the digesting compartments must achieve thermophylic temperatures, i.e. approximately 150 degrees F., although the material discharged from the discharge compartment may have temperatures reduced to the mesophilic range, i.e. less than 100 degrees F. Start-up procedures will include the passage of the initially introduced materials back into the infeed compartment for re-processing until the materials have reached the thermophylic temperatures and the composting of the materials has been completed. Once the start-up procedure has been completed, material need only pass through the vessel 11 one time, provided that thermophylic temperatures have been achieved.

An equipment failure that disrupts the composting process, such as a failure in the drive mechanism 20, may require a modified start-up or recovery procedure to be utilized to achieve the aggressive composting of the material. An interruption of the operation of the composter 10 as short as three days will require the use of a recovery procedure to re-establish the aggressive composting process. Likewise, regular infeed of new materials to be composted is necessary to maintain the aggressive composting process. The failure to add fresh materials for two days has caused a decline in the composting activity.

Material can be discharged from the discharge compartment 34 during rotation of the vessel 11 simply by opening the discharge doors 39 and collecting the material discharged therefrom. Preferably, a second conveyor (not shown) will be positioned to collect the discharged compost and convey the compost to a preselected location for cool down and subsequent disposition. For compost formed from animal wastes, the nitrogen in the compost is fixed and the compost can be spread directly onto the fields without fear of contamination of the water supply from runoff or leaching into the ground water.

Referring now to FIGS. 10–15, the automated control mechanism 60 can best be seen. The control mechanism 60 includes a plurality of sensors, including a temperature sensor 62 for each of the digesting compartments 33 and a temperature sensor 63 for the air flow discharged from the vessel 11. The temperature sensors 62 are fixed to the vessel 11 to be rotated therewith. As a result, the lines from the sensors 62 are connected to a conventional slip ring 65 to permit the transmission of data from the rotating sensors 62 to stationary lines for transfer to a microprocessor 75. A sampling port 67 is stationarily mounted to draw a sample of the air discharged from the vessel into both an ammonia sensor 68 and a carbon dioxide sensor 69, which can be positioned remotely from the vessel 11, to provide an indication of the levels of ammonia and carbon dioxide in the air flow discharged from the vessel 11. Data lines transmit information from the ammonia and carbon dioxide sensors 68, 69 to the microprocessor 75.

Figure 10:
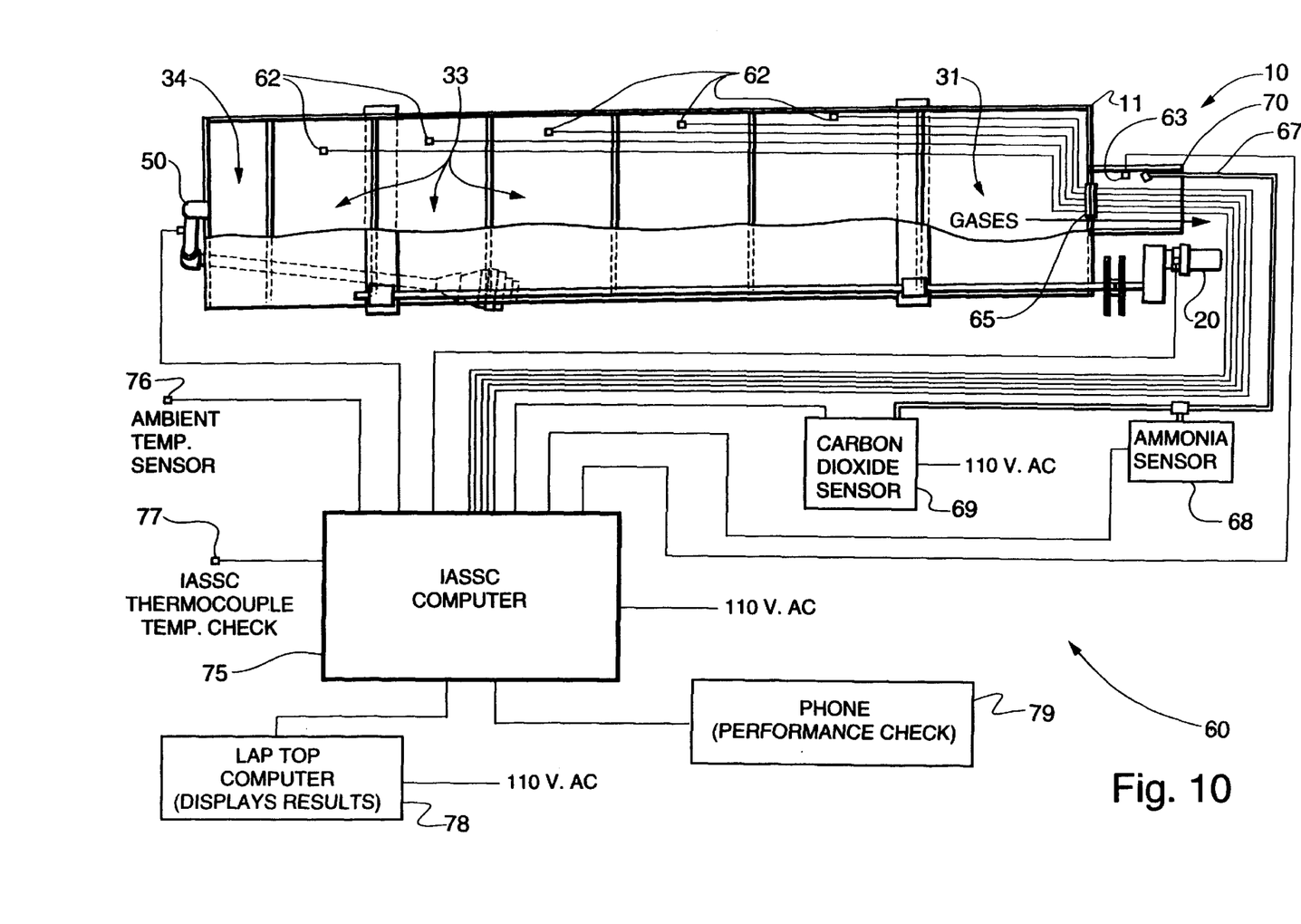
FIG. 10 is schematic view of the composter control system, the side elevational view of the rotary composter vessel being broken away to more clearly show the location of the sensors.
Figure 11:
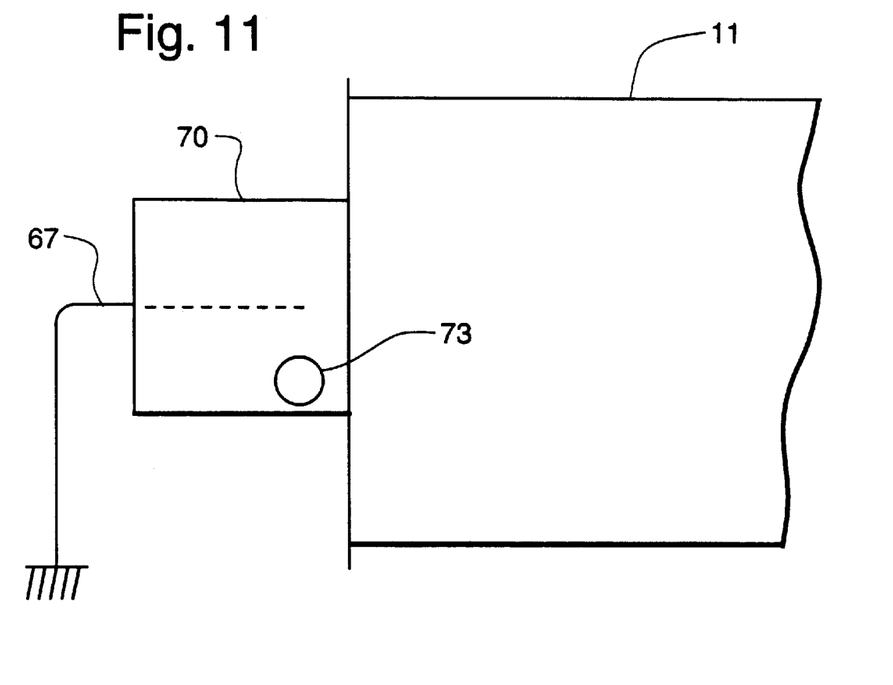
FIG. 11 is a schematic partial side elevational view of the infeed end of the rotary composter vessel with a sensor drum mounted thereto for the discharge of air therethrough to enhance the effectiveness of the gas sensors used in the control system.
Figure 12:
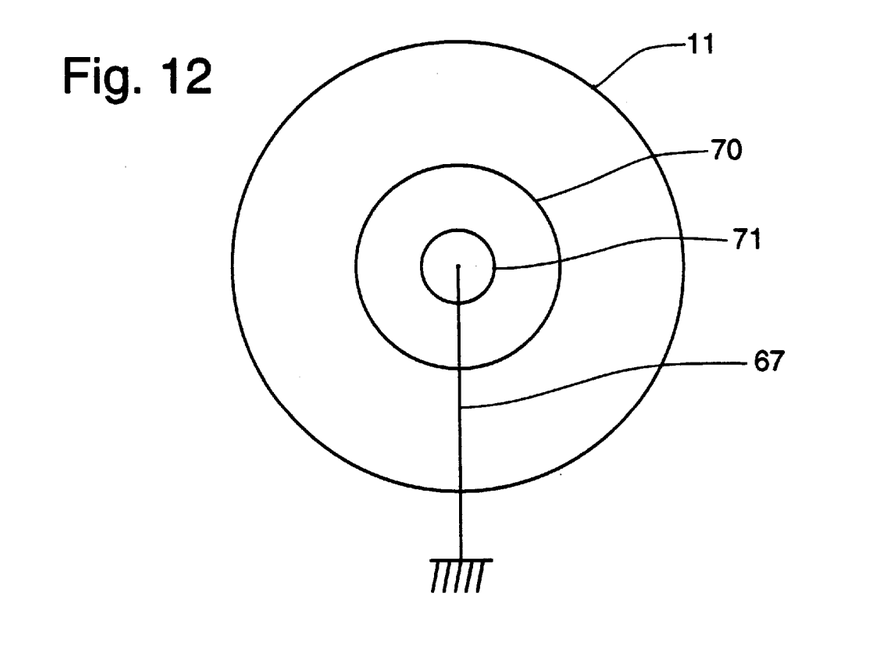
FIG. 12 is a schematic front elevational view of the infeed end of the rotary composter seen in FIG. 11.

As best seen in FIGS. 10–12, the vessel 11 is provided with a sensor drum 70 mounted to the exterior of the vessel 11 around the screened opening 54 in the infeed endwall 13a for rotation with the vessel 11. The temperature sensor 63 and the sampling port 67 are mounted in a stationary manner through an opening 71 in the end of the sensor drum 70 to obtain an appropriate sampling of the air flow discharged from the vessel 11 before the discharged air gets dissipated into the atmosphere. The sensor drum is provided with an open port 73 located next to the vessel 11 to allow any debris to fall out of the sensor drum 70 as it rotates with the vessel 11. The material that might be in the sensor drum 70 would most likely have passed into the sensor drum 70 through the screen opening 54 in the vessel 11.

Returning now to FIGS. 10 and 13–15, the microprocessor 75 is preferably an input analog (IASSC) computer that receives input information from the temperature sensors 62, 63, the gas sensors 68, 69, an ambient air temperature sensor 76, the speed of rotation of the vessel 11 from the drive mechanism 20 and the rate of air flow from the air infeed mechanism 50. In addition, the IASSC computer 75 is preferably housed in a protective box (not shown) in which a temperature sensor 77 is mounted to monitor the environment temperature for the computer 75. The IASSC computer 75 can be accessed from an immediate display 78, such as a lap top computer, or through a modem 79 that permits a remote monitoring through the telephone lines.

Desired ranges of the temperature, ammonia and carbon dioxide parameters, which may vary with respect to the material being composted, are stored within the IASSC computer 75. The microprocessor 75 frequently monitors these parameters and compares the sensed values with the desired ranges and makes a determination as to whether each parameter is within, above or below the respective desired range. The resultant determination can be reflected in the condition matrix depicted in FIG. 14, from which the microprocessor 75 can refer to a look-up table depicted in FIG. 15 to display the corrective action to be taken.

The microprocessor 75 can be programmed to allow corrective action with respect to the air flow and the rotational speed of the vessel 11 to be taken automatically. With an appropriate material infeed mechanism (not shown), the microprocessor 75 may be able to add incremental amounts of material as reflected in the look-up table of FIG. 15. Accordingly, the operative control of the rotary composter 10 can be at least partially automated. Preferably, the microprocessor 75 can store three days worth of data from the various sensors to permit the periodic display and/or downloading of the data to permanent files, as opposed to real-time monitoring of the data or automation of the operative controls.

Figure 15:
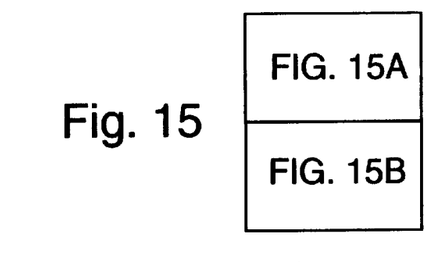
FIG. 15 is a key for the configuration of FIG. 15A and FIG. 15B.
Figure 15A:
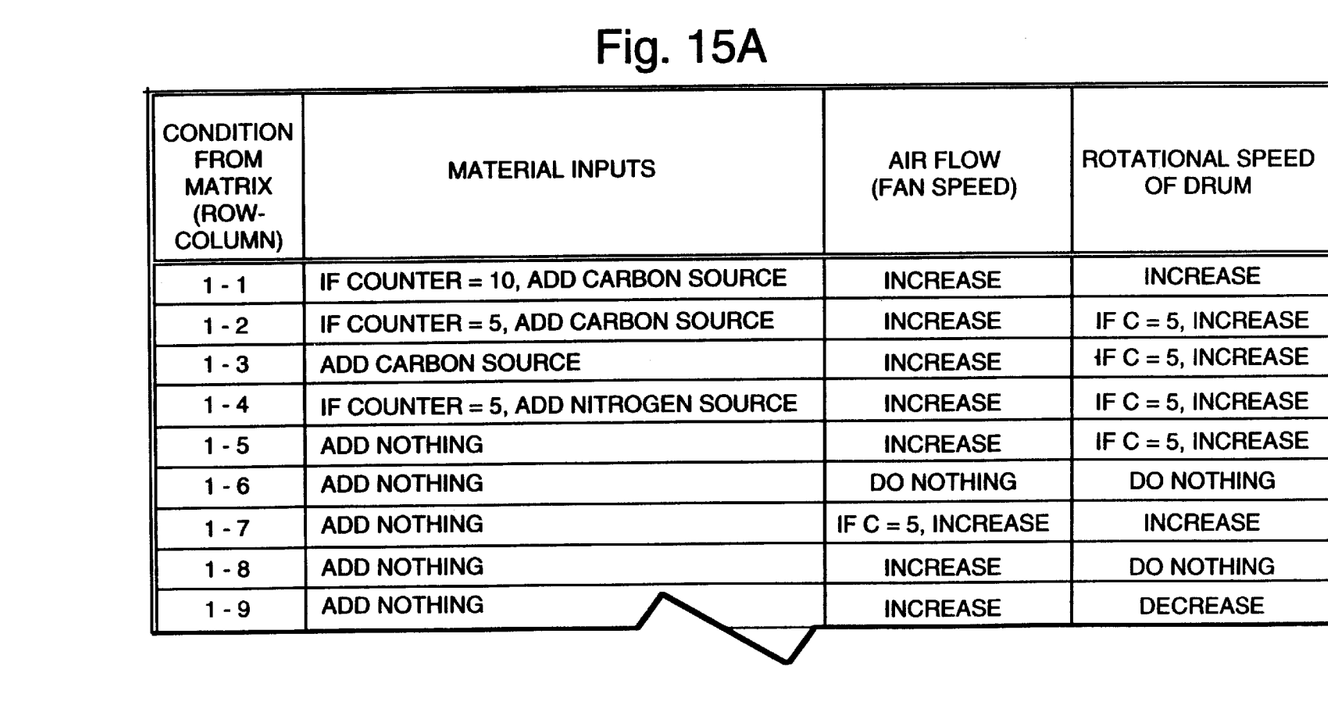
FIGS. 15A and 15B, when taken together in the manner depicted in FIG. 15, show an input change table forming the look-up table for the microprocessor to control air flow through the rotary composter vessel and rotational speed of the rotary composter vessel as a function of the combination of parameters detected by the sensors of the control system.
Figure 15B:
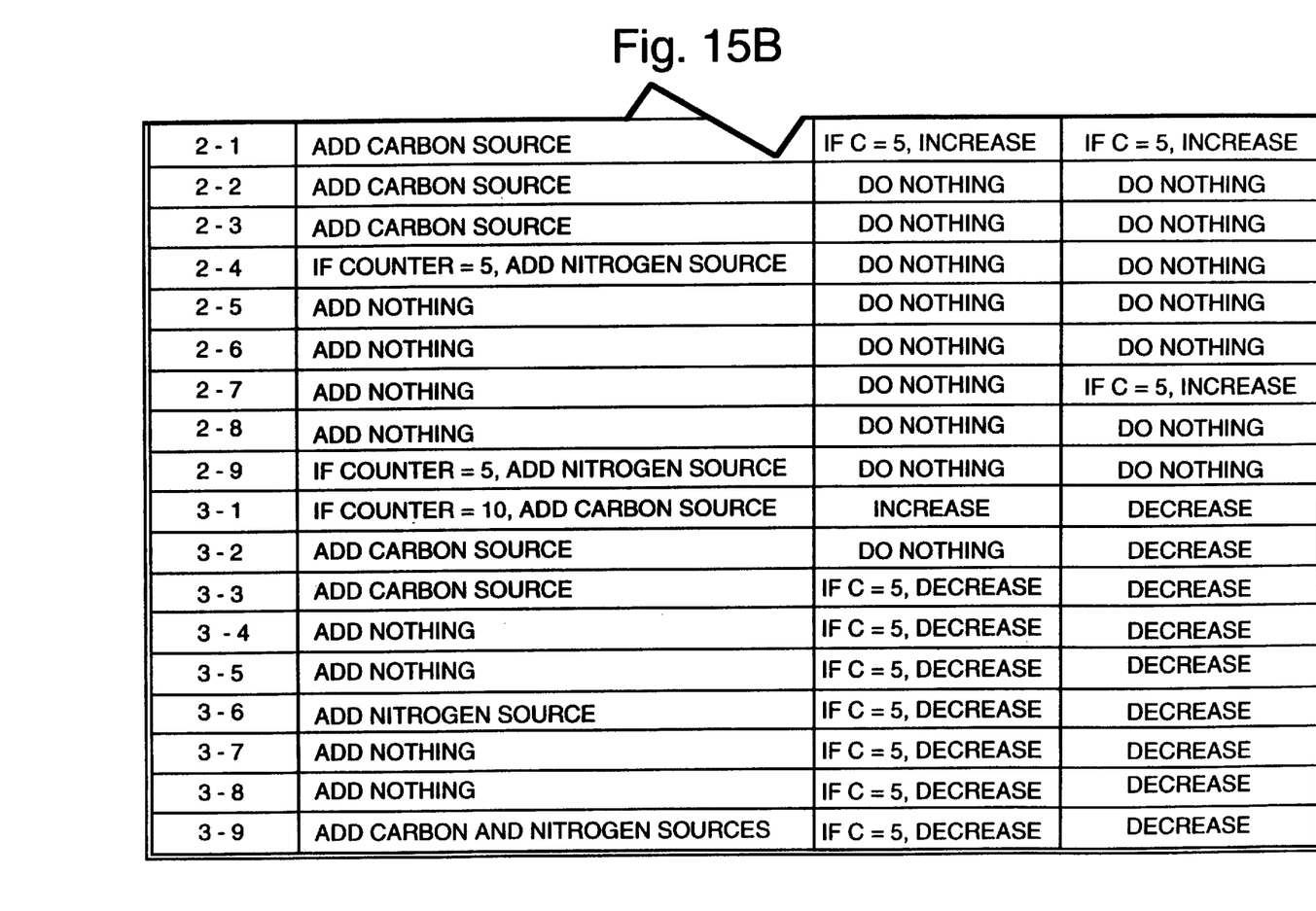

The microprocessor 75 can also be programmed to call through a list of phone numbers in the event an operating parameter moves outside the respective desired range to permit an immediate manual correction of the operation of the rotary composter 10, in which case the look-up table of FIG. 15, or the appropriate portion thereof, can be displayed to assist the operator in determining the appropriate corrective action to undertake.

Figure 13:
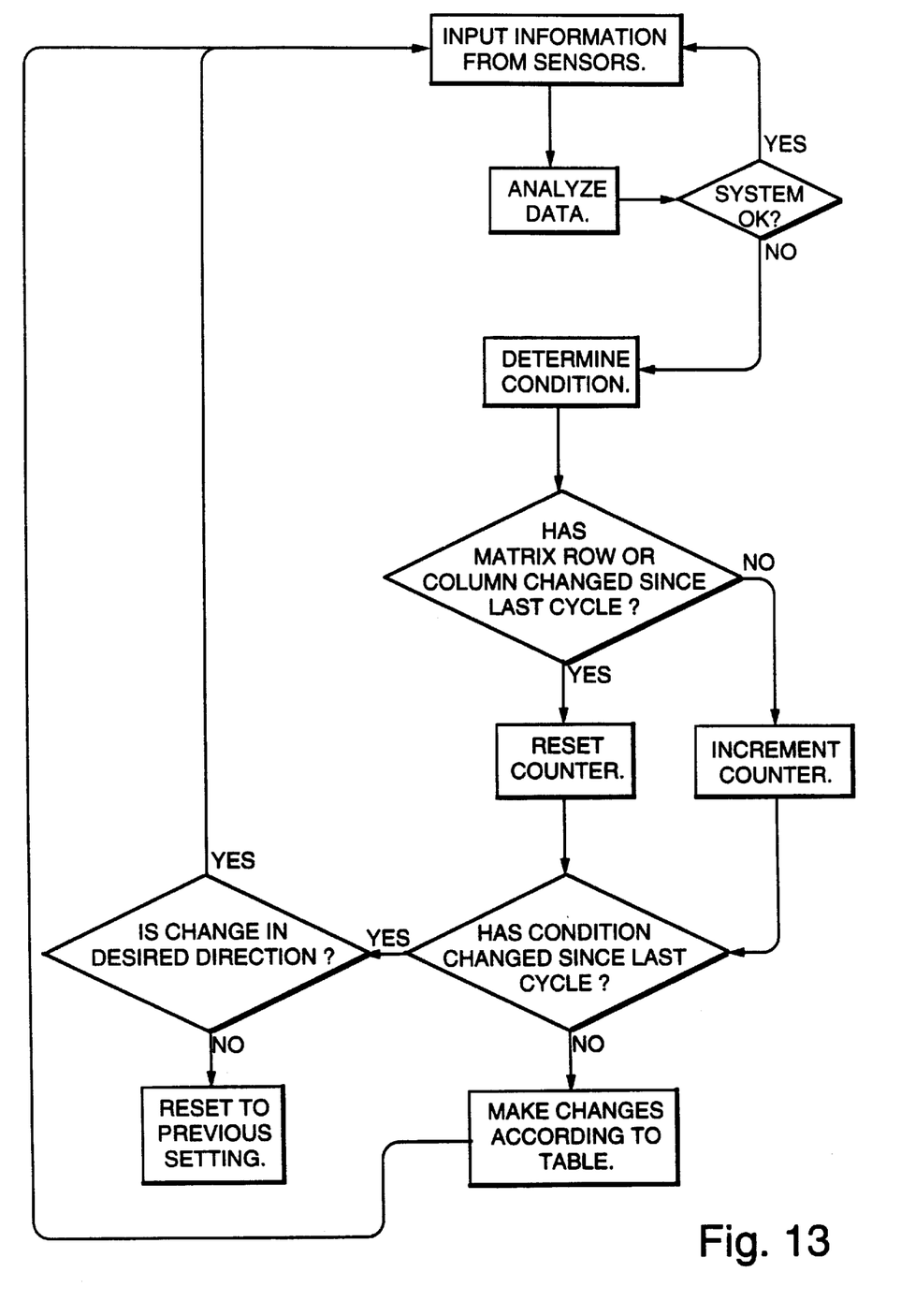
FIG. 13 is logic flow diagram for the control system.
Figure 14:
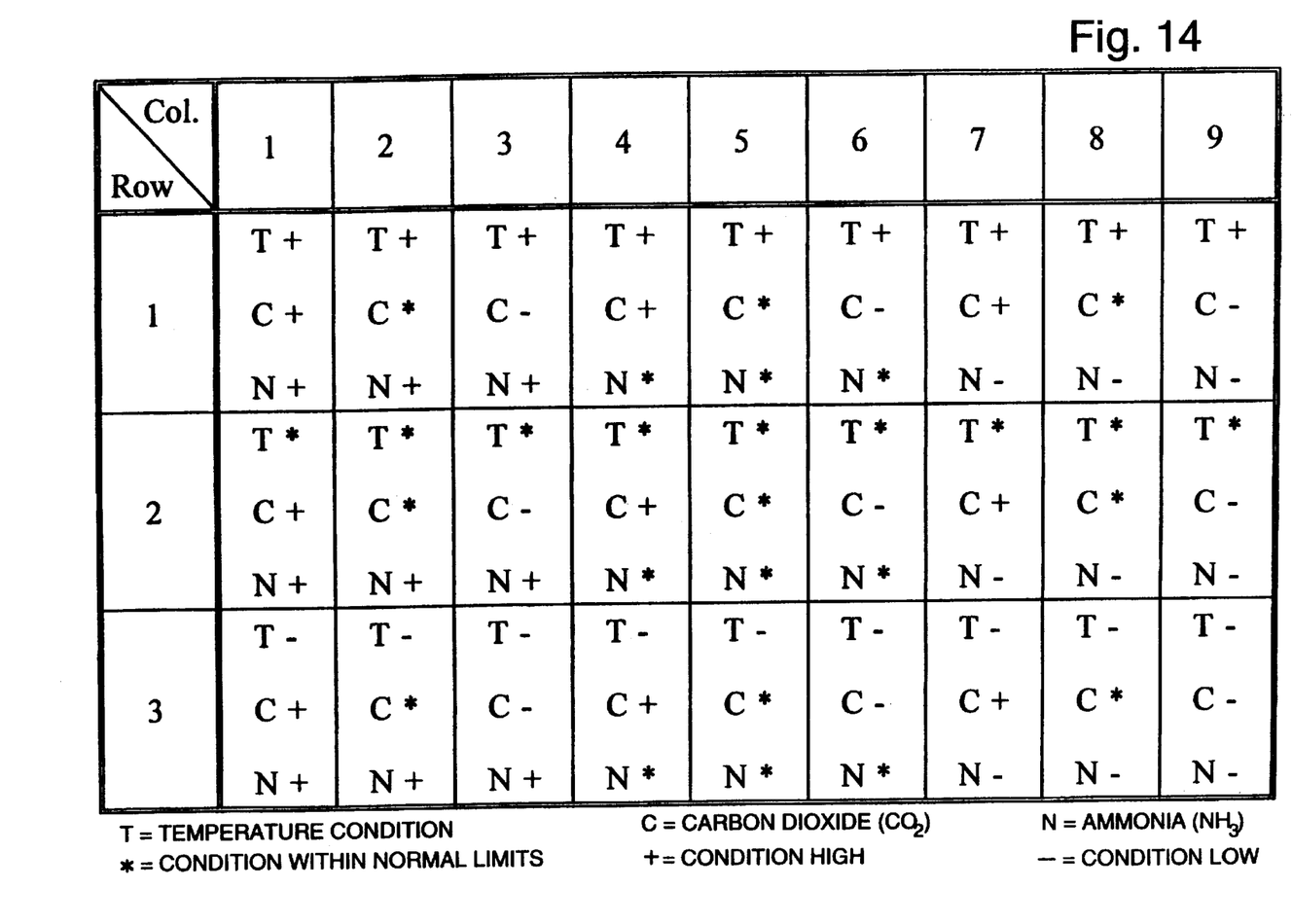
FIG. 14 is a condition matrix table reflecting the different combinations of the parameters of temperature, carbon dioxide and ammonia as detected by the sensors forming part of the control system for the rotary composter.

The logic flow diagram relating to the automated operation of the rotary composter 10 by the microprocessor 75 is depicted in FIG. 13. The microprocessor 75 receives in step 81 data input from the various sensors 62, 63, 68, 69 and 76, as well as data input information from the air infeed mechanism 50 and the drive mechanism 20 and analyzes in step 82 the data to determine if the data fits within the respective desired ranges. If the data received indicates in step 83 that the system is operating properly, then the microprocessor continues a loop through steps 81, 82 and 83.

In the event that one of the data inputs falls outside the corresponding desired range, the microprocessor determines in step 83 that the system in not operating properly. In step 84, the microprocessor 75 determines, from the condition matrix depicted in FIG. 14, the condition of the composter 10. In step 85, a query is made as to whether there has been a change in the position within the condition matrix. If not, a counter in incremented. If so, then the counter is reset to zero. The counter is reflected in the look-up table depicted in FIG. 15 as either "Counter=" or "C=" and provides a means by which action can be delayed for several cycles.

In step 86, a query is made as to whether there has been any change in the condition since the last cycle. If a change in the sensed condition has occurred, a subsequent query is made in step 87 as to whether the change is in the direction toward placing the wayward parameter into the corresponding desired range. If yes, then the controls are not changed and another cycle is instituted. If not, then the operating parameters, including fan speed and rotational speed of the drum, are returned to the previous setting and another cycle in instituted. Because of the slow rotational speed of the vessel 11 and the slow response time to register any changes in the condition of the compost or the operation of the composter, each cycle needs to be spaced at 10 to 15 minute intervals and perhaps longer under cold weather conditions. In fact, the microprocessor 75 can utilize the sensed ambient air temperature to vary the cycle intervals, with colder weather requiring longer cycle intervals.

If the result of the query as to the change in the condition since the last cycle is negative, the microprocessor 75 refers to the look-up table depicted in FIG. 15 and effects the necessary changes to the air infeed mechanism 50 and drive mechanism 20, and, if applicable, effects the necessary changes to the material being fed into the infeed compartment 31 at step 88. After the changes are effected, the cycle is started again at step 81.

Accordingly, the control system 60 has the ability to provide monitoring of the system for manual manipulation or the ability to automatically vary selected control functions. The ability to monitor or to effect control can be accomplished on-site or from a remote location. Some functions of the rotary composter 10 can be controlled by direct dial-in over the telephone with a touch tone phone.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A control system for a rotary composter having a vessel divided into a plurality of digesting compartments, a drive mechanism for effecting rotation of the vessel, an air infeed mechanism for providing a flow of air through the vessel, and means for feeding material to be composted into the vessel, comprising:

temperature means for sensing the temperature in at least one of said digesting compartments;

discharge means for directing the flow of air passing through said vessel externally of said vessel;

gas means for sensing predetermined gases in said air flow, said gas means includes a sampling port mounted on said vessel within a stream of air being discharged through said discharge means to direct a sampling portion of said air flow to gas sensors to detect the level of carbon dioxide and ammonia within said air flow;

processing means operatively connected to said temperature means and said gas means to accept data provided by said temperature means and said gas means and compare said data to predetermined ranges for such data stored in said processing means; and indicator means operatively associated with said processing means to indicate when such data is outside of the corresponding predetermined range for such data.

2. The control system of claim 1 wherein said temperature means includes a temperature sensor corresponding to each of said digesting compartments, each said temperature sensor being affixed to said vessel to be rotatable therewith.

3. The control system of claim 1 wherein said processing means includes a look-up table suggesting corrective action to take for a condition matrix corresponding to the different combination of data received relative to the corresponding predetermined ranges.

4. The control system of claim 3 wherein said air infeed mechanism and said drive mechanism are variably operable, said processing means being operably connected to said air infeed mechanism and said drive mechanism to permit said processing means to control the operation thereof.

5. The control system of claim 4 wherein said air infeed mechanism and said drive mechanism can be controlled manually through said processing means from a remote location.

6. The control system of claim 4 wherein said air infeed mechanism and said drive mechanism can be controlled by said processing means in response to the corresponding suggested actions from said look-up table.

7. The control system of claim 4 wherein said processing means collects data from said temperature sensors and said gas sensors in cycles spaced in time by a cycle interval.

8. The control system of claim 7 further comprising an ambient temperature sensor to sense the ambient air temperature, said processing means varying said cycle interval as a function of the sensed ambient temperature.

9. A control system for a rotary composter having a vessel divided into a plurality of digesting compartments, a drive mechanism for effecting rotation of the vessel an air infeed mechanism for providing a flow of air through the vessel, and means for feeding material to be composted into the vessel, comprising:

temperature means for sensing the temperature in at least one of said digesting compartments;

gas means for sensing predetermined gases in said air flow, said gas means including a sampling port to direct a portion of said air flow to gas sensors to detect the level of carbon dioxide and ammonia within said air flow;

a sensor drum rotatably affixed to said vessel and being mounted such that the air flow discharged from said vessel must pass through said sensor drum, said sampling port being positioned within said sensor drum to obtain a sampling of said air flow before being dissipated into the atmosphere;

processing means operatively connected to said temperature means and said gas means to accept data provided by said temperature means and said gas means and compare said data to predetermined ranges for such data stored in said processing means; and indicator means operatively associated with said processing means to indicate when such data is outside of the corresponding predetermined range for such data.

10. The control system of claim 9 wherein said vessel is further provided with a slip ring operably connected to said temperature sensors to permit said rotating temperature sensors to transmit data to a stationary line connected to said processing means.

11. In a rotary composter having a vessel divided into a plurality of digesting compartments, a drive mechanism for effecting rotation of the vessel, an air infeed mechanism for providing a flow of air through the vessel, and means for feeding material to be composted into the vessel, the improvement comprising:

a control system for monitoring the operation of said rotary composter, particularly the temperature of the material being composted within said digesting compartments and the level of carbon dioxide and ammonia gases emanating from the material being composted and being discharged with the flow of air through the vessel through a discharge means in said vessel to direct said flow of air externally of said vessel, said control system including:

temperature sensors for sensing the temperature of the material within each of said digesting compartments;

gas sensors for sensing the level of carbon dioxide gas and ammonia gas within said air flow, said gas sensors being operatively associated with a sampling port mounted on said vessel and being operable to extract a sampling portion of the flow of air being discharged from said vessel and direct said sampling portion to said gas sensors;

processing means operatively connected to said temperature sensors and said gas sensors to accept data provided by said temperature sensors and said gas sensors and compare said data to predetermined ranges for such data stored in said processing means; and indicator means operatively associated with said processing means to indicate when such data is outside of the corresponding predetermined range for such data.

12. The rotary composter of claim 11 wherein said air infeed mechanism and said drive mechanism are variably operable, said processing means being operably connected to said air infeed mechanism and said drive mechanism to permit said processing means to control the operation thereof.

13. The rotary composter of claim 12 wherein said air infeed mechanism and said drive mechanism can be controlled manually through said processing means from a remote location.

14. The rotary composter of claim 12 wherein said air infeed mechanism and said drive mechanism can be controlled by said processing means in response to the corresponding suggested actions from a look-up table stored in said processing means.

15. The rotary composter of claim 12 wherein said vessel is further provided with a slip ring operably connected to said temperature sensors to permit said rotating temperature sensors to transmit data to a stationary line connected to said processing means.

16. The rotary composter of claim 12 wherein said processing means collects data from said temperature sensors and said gas sensors in cycles spaced in time by a cycle interval, said control system further including an ambient temperature sensor to sense the ambient air temperature, said processing means varying said cycle interval as a function of the sensed ambient temperature.

17. A rotary composter comprising:

a vessel divided into a plurality of digesting compartments;

a drive mechanism for effecting rotation of the vessel;

an air infeed mechanism for providing a flow of air through the vessel;

means for feeding material to be composted into the vessel;

a control system for monitoring the operation of said rotary composter, particularly the temperature of the material being composted within said digesting compartments and the level of carbon dioxide and ammonia gases emanating from the material being composted and being discharged with the flow of air through the vessel, said control system including:

temperature sensors for sensing the temperature of the material within said digesting compartments;

gas sensors for sensing the level of carbon dioxide gas and ammonia gas within said air flow, said gas sensors being operatively associated with a sampling port mounted on said vessel and being operable to extract a sampling portion of the flow of air being discharged from said vessel and direct said sampling portion to said gas sensors;

processing means operatively connected to said temperature sensors and said gas sensors to accept data provided by said temperature sensors and said gas sensors and compare said data to predetermined ranges for such data stored in said processing means; and indicator means operatively associated with said processing means to indicate when such data is outside of the corresponding predetermined range for such data; and a sensor drum affixed to said vessel to be rotatable therewith, said sensor drum being mounted such that the air flow discharged from said vessel must pass through said sensor drum, said sampling port being stationarily mounted through an opening within said sensor drum to obtain a sampling of said air flow before being dissipated into the atmosphere.

18. A rotary composter comprising:

a vessel divided into a plurality of digesting compartments;

a variable speed drive mechanism for effecting rotation of the vessel;

a variable speed air infeed mechanism for providing a flow of air through the vessel to be discharged from a discharge opening in said vessel; and an automated control system for monitoring the operation of said rotary composter, including:

temperature sensors for sensing the temperature of the material within said digesting compartments;

a sampling port for collecting a sample of the air flow through said vessel near said discharge opening;

a carbon dioxide gas sensor operably connected to said sampling port for sensing the level of carbon dioxide gas within said air flow;

an ammonia gas sensor operably connected to said sampling port for sensing the level of ammonia gas within said air flow; and a microprocessor operatively connected to said temperature sensors and said carbon dioxide and ammo nia gas sensors to accept data provided thereby, to compare said data to predetermined ranges for such data stored in said microprocessor, to determine the condition of said data with respect to a condition matrix, and to determine corrective action to undertake relative to the condition matrix from a look-up table stored in said microprocessor, said microprocessor further being connected to said air infeed mechanism and said drive mechanism to effect a modification of the speed of operation of said air infeed mechanism and of said drive mechanism, selectively as defined per the corrective action of said look-up table; and a sensor drum affixed to said vessel to be rotatable therewith, said sensor drum being mounted such that the air flow discharged from said vessel must pass through said sensor drum, said sampling port being stationarily mounted through an opening within said sensor drum to obtain a sampling of said air flow before being dissipated into the atmosphere.

* * * * *